United States Patent [19]
Ho

[11] Patent Number: 5,754,419
[45] Date of Patent: May 19, 1998

[54] SURGE AND OVERCURRENT LIMITING CIRCUIT FOR POWER CONVERTERS

[75] Inventor: Simon Mo Chan Ho, Hong Kong, Hong Kong

[73] Assignee: Astec International Limited, Kowloon, Hong Kong

[21] Appl. No.: 646,713

[22] Filed: May 9, 1996

Related U.S. Application Data

[63] Continuation-in-part of Ser. No. 608,140, Feb. 28, 1996.
[51] Int. Cl.[6] ............................................. G05F 1/46
[52] U.S. Cl. .................................................. 363/89
[58] Field of Search ................ 363/40–65; 323/222–272

[56] References Cited

U.S. PATENT DOCUMENTS 5,001,620  3/1991  Smith ........................................ 363/89

Primary Examiner—Aditya Krishnan
Attorney, Agent, or Firm—Coudert Brothers

[57] ABSTRACT

Current flow between the boost inductor and the output bulk capacitor in a boost converter type power factor correction circuit for an AC-to-DC power converter is controlled by a single power MOSFET which is operated by a gate driver in a low-level constant current surge limiting mode during initial charging of the bulk capacitor, and in a high-level current-limiting mode once the bulk capacitor is sufficiently charged for normal operation. The power MOSFET gate driver is in turn controlled by a control logic which is connected to the input and output voltages of the boost converter, and which allows the circuit to cope with short circuits and input power interruptions and glitches.

9 Claims, 4 Drawing Sheets

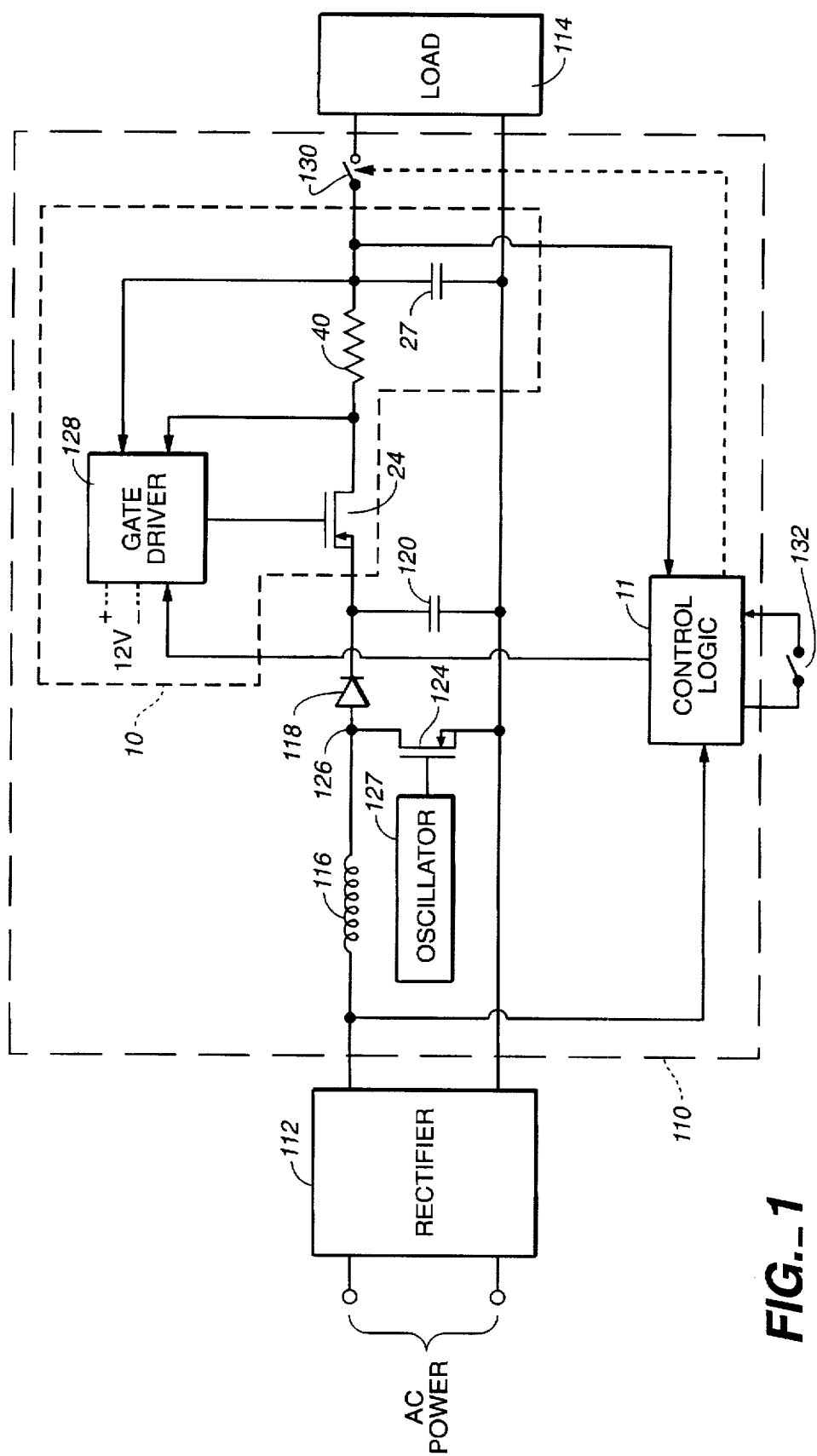
FIG._1

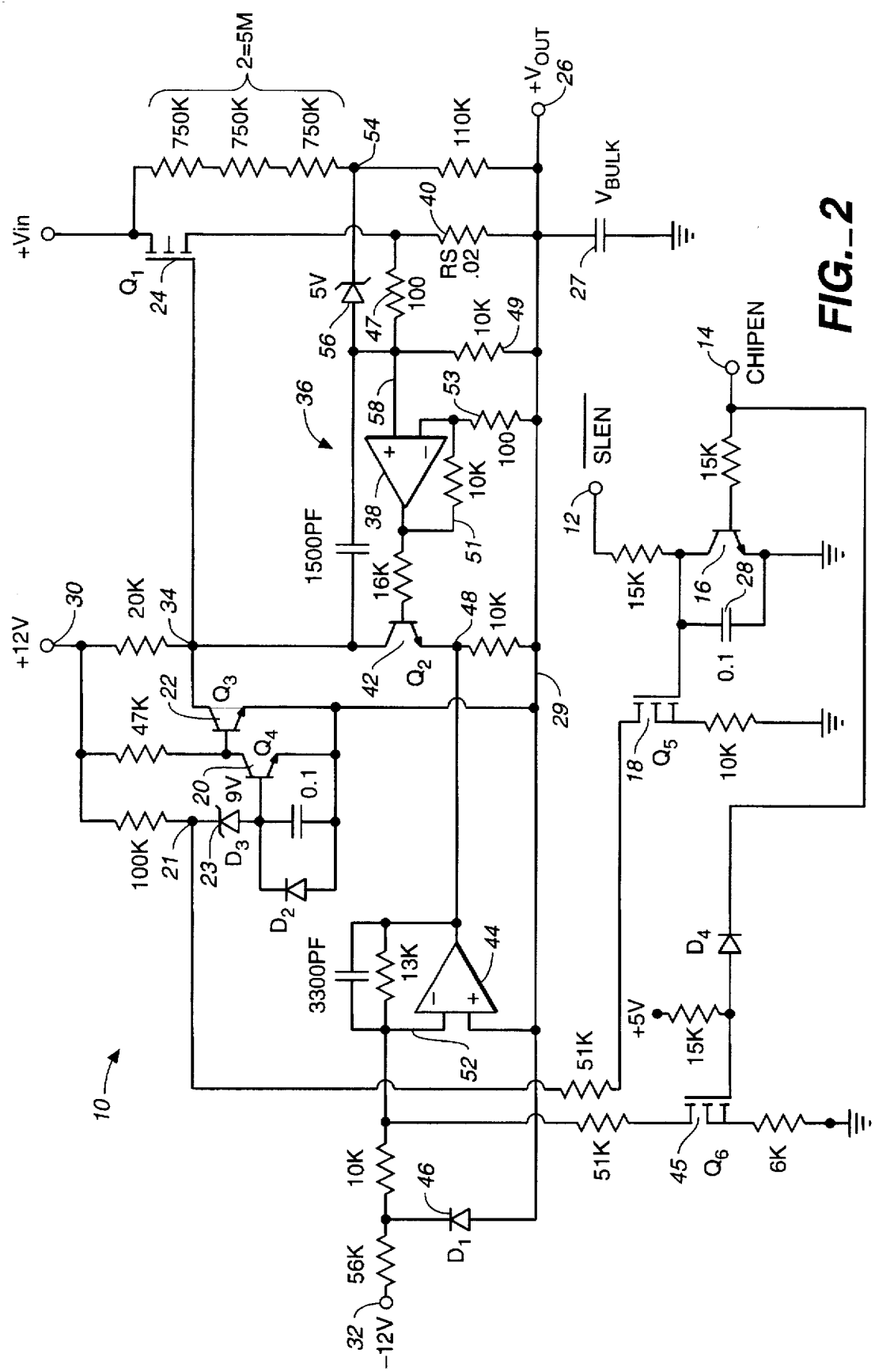
FIG._2

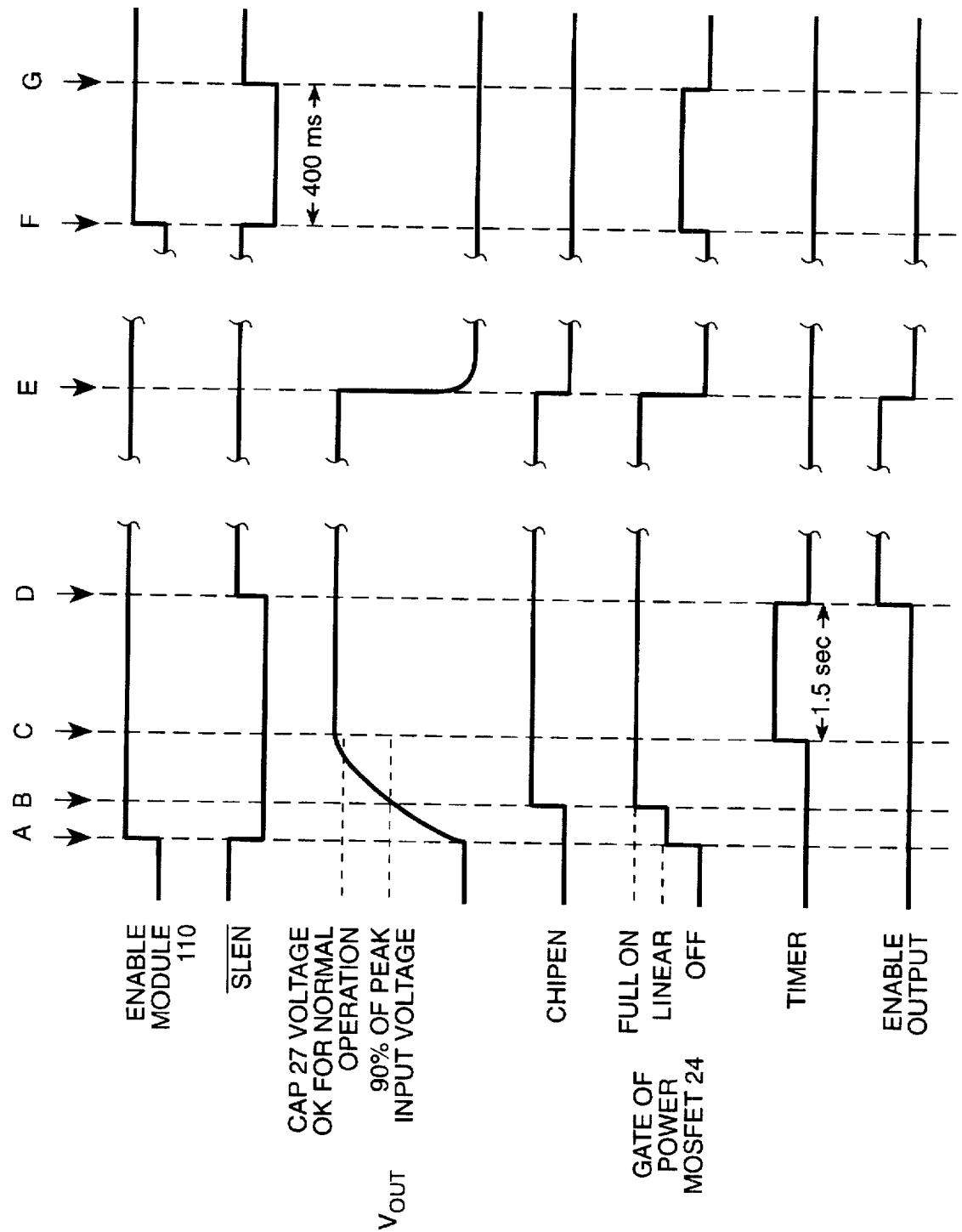
FIG._3

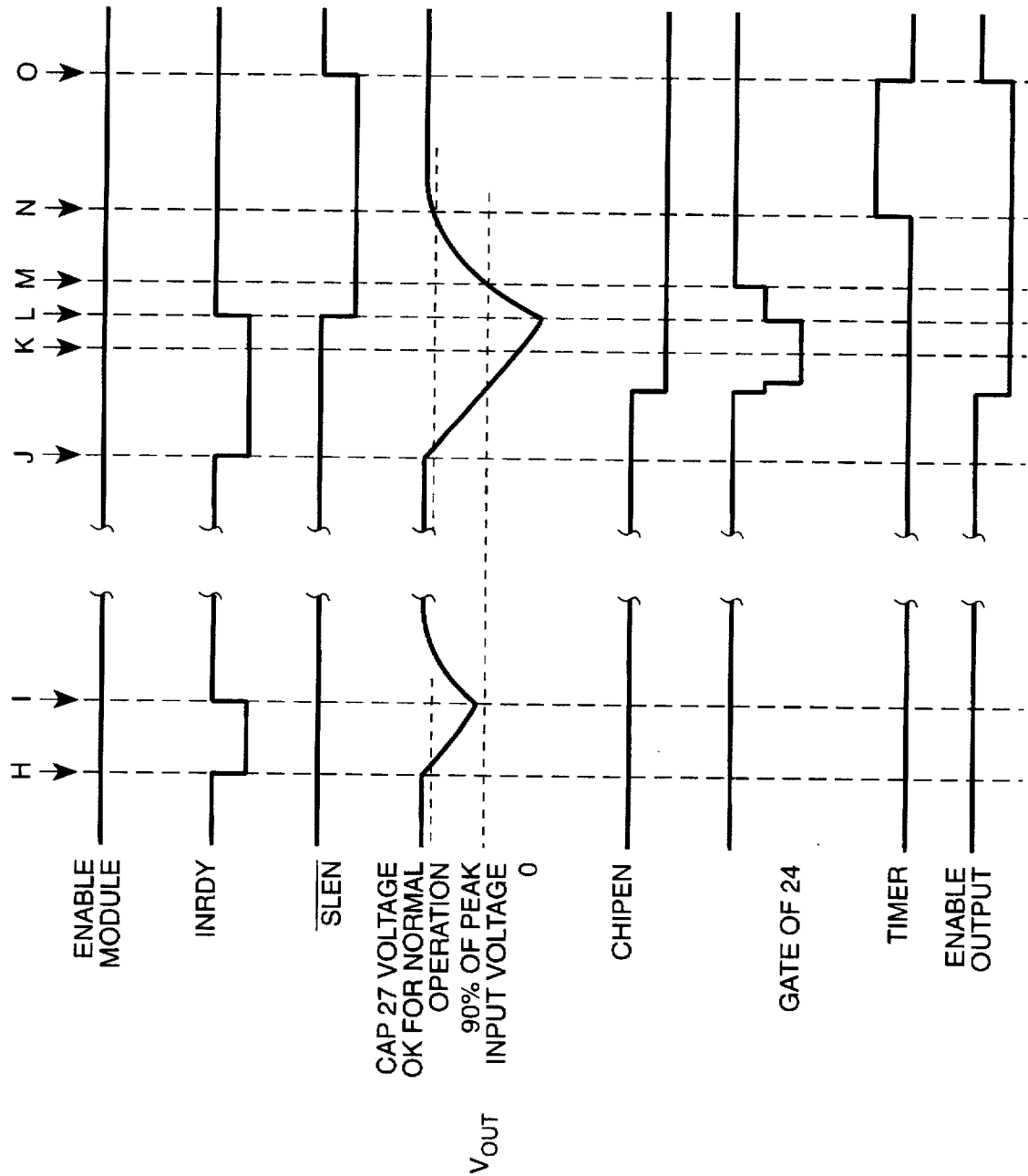
FIG._4

5,754,419

SURGE AND OVERCURRENT LIMITING CIRCUIT FOR POWER CONVERTERS

This is a continuation-in-part of application Ser. No. 08/608,140, filed Feb. 28, 1996.

FIELD OF THE INVENTION

This invention relates to a current regulating regulator for a power factor-correction circuit in AC-DC power converters, and more particularly to a circuit in which control of a single power MOSFET provides both surge limiting and overcurrent protection without the use of other power components.

BACKGROUND OF THE INVENTION

AC-to-DC power converters conventionally include a power factor correction (PFC) circuit which uses a conventional boost converter switched at a rate on the order of tens or hundreds of kilohertz that is much greater than the AC power frequency (e.g., 50 to 60 Hz). The boost converter makes the current drawn from the full-wave rectified AC input follow the voltage, thus presenting essentially a unity power factor to the AC power grid. At the same time, the boost converter produces a DC voltage substantially higher than the peak voltage of the AC input. The functioning of this circuit is detailed in U.S. Pat. No. 5,001,620 to Smith.

The PFC boost converter consists essentially of a network including an inductor, diode and capacitor connected in series across the full-wave rectified AC input. The capacitor is shunted by a switch opening and closing at the above-mentioned multi-kilohertz rate. In a standby mode, energy from the inductance is stored in the capacitor, and a DC voltage greater than the peak of the rectified AC input appears across the capacitor.

A load such as a DC-to-DC converter connected in parallel with a bulk capacitor can be connected to the boost converter through a series switch so that it can be turned on and off. The bulk capacitor is a large capacitor which, when so connected, becomes a part of the boost converter and stores the high amounts of energy put out by the boost converter inductance under full load conditions.

Among the operational features needed by the PFC circuit is that the current surge which occurs when the large bulk capacitor is first connected to the boost converter circuit needs to be limited. Surge current limiting is typically implemented in prior art PFC circuits using a large resistor or thermistor placed in series with the bulk capacitor during power-up which is then bypassed with a relay or transistor once power-up is complete. Surge current limiting and short circuit protection during power on also conventionally includes a rectifier bridge circuit using a plurality of silicon controlled rectifiers (SCRs).

As technological advances require ever greater miniaturization of electronic components, the use of such bulky and expensive power components must be minimized. Consequently, it is desirable to eliminate the SCRs without affecting the operational features of the converter.

What is needed is a circuit which utilizes a single power MOSFET to provide both surge current limiting and overcurrent limiting.

SUMMARY OF THE INVENTION

The present invention uses a single power MOSFET to provide both surge limiting and overcurrent limiting. Surge limiting is accomplished by a feedback circuit which holds the gate voltage of the power MOSFET at a regulated low level. This maintains the current through the power MOSFET at a constant level while the bulk capacitor is being charged. When the bulk capacitor charge exceeds 90% of the peak input voltage, the power MOSFET's gate voltage is fully turned on for continuous operation. A feedback circuit then sets an upper limit to the current through the power MOSFET to prevent excessive current from being coupled through the MOSFET.

Broadly stated, the present invention comprises a power factor correction circuit for AC-to-DC power converters, comprising: a source of rectified AC power; a boost converter connected to said source, said boost converter including: an inductor, diode, and first capacitor connected in series across said source; a switch connected in parallel with said diode and said first capacitor, said switch being arranged to open and close at a frequency substantially higher than the frequency of said AC power; a transistor, a current sensing resistor, and a second capacitor connected in series with each other and in parallel with said first capacitor; and an output connected across said second capacitor, whereby said transistor controls the current flow to said second capacitor and said output; a gate driver connected to said transistor and said current sensing resistor for controlling the base bias of said transistor; and a control logic connected to said source, said output and said gate driver for controlling said gate driver in response to the voltages of said source and said output; said control logic and gate driver being arranged to bias said transistor into a low-current mode when said output voltage is less than a predetermined function of said source voltage, and into a high-current mode when said output voltage is more than said function.

BRIEF DESCRIPTION OF THE DRAWINGS

FIG. 1 is a circuit diagram, partly in block form, showing a PFC circuit according to the invention;

FIG. 2 is a circuit diagram showing the gate driver circuitry of this invention;

FIG. 3 is a time-amplitude diagram illustrating the time relationship of various control signals in the PFC circuit of FIG. 1; and FIG. 4 is a time-amplitude diagram showing the effect of input power interruptions of various duration on the control signals and circuit of FIG. 1.

DETAILED OF THE PREFERRED EMBODIMENT

FIG. 1 shows the environment in which the surge and overcurrent limiting circuit 10 of this invention operates. The circuit 10 is part of a PFC module 110 which provides power factor correction and voltage boost between a full-wave rectified AC source 112 and a DC load 114 such as a DC-to-DC converter. Conventionally, a PFC module contains a boost converter circuit which includes a boost inductor 116, a diode 118, a capacitor 120 and a switch 124 which grounds the junction 126 at a rate on the order of 110 kHz by an appropriately controlled oscillator 127. When the PFC module 110 is enabled by turning the power MOSFET 24 on, the boost converter produces a voltage across bulk capacitor 27 which is considerably higher (e.g. 350 V DC) than the peak voltage (e.g. 170 V) of the rectified AC supply produced by rectifier 112.

In accordance with the present invention, the power MOSFET 24 is selectively operated in a linear mode or a full-on mode by a gate driver 128 whose structure and operation is detailed below in connection with FIG. 2. The inputs to the gate driver 128 are a floating 12 V DC supply, the voltage developed across the current sensing resistor 40, and two control signals generated by the control logic 11 (/SLEN and CHIPEN, FIG. 3) discussed below. The output of the PFC module 110 is enabled by the control logic 11, when the output voltage has stabilized, as symbolically indicated by the switch 130. The control logic 11 is activated by an external module-enabling signal (symbolically shown as a switch 132) produced directly or indirectly by an operator or by appropriate conventional circuitry (not shown).

FIG. 2 shows the detail of the gate control chip 10. Initially, the PFC module 110 of FIG. 1 is in a disabled condition in which, as shown in FIG. 3, the /SLEN (active-low surge limit enable) control signal generated by the logic control 11 at 12 (FIG. 2) is high, and the CHIPEN (active-high gate control chip 10 enable) control signal at 14 is low. This keeps transistor 16 off and the field effect transistor (FET) 18 on. In this condition, transistor 20 is held off because the voltage at junction 21 is less than the 9 V required by zener diode 23. This in turn holds transistor 22 on. Transistor 22 holds the gate of power MOSFET 24 low, so that power MOSFET 24 is off and no current can flow to the output 26. Because the bulk capacitor 27 is discharged, line 29 is at system ground.

The module 110 is enabled by generating the ENABLE MODULE 110 signal of FIG. 3. This causes the /SLEN signal 12 to be driven low (time A in FIG. 3). The low /SLEN signal grounds the gate of FET 18 and turns it off. Junction 21 now rises above 9 V from the floating 12 V supply 30, 32, zener diode 23 conducts, and transistor 20 turns on. This turns transistor 22 off and frees the gate of power MOSFET 24 to follow the voltage at junction 34.

The voltage at junction 34 is the output of a feedback circuit 36 which gives the power MOSFET 24 a constant-current characteristic and limits any current surges to the bulk capacitor 27. The feedback circuit 36 is driven by a differential amplifier 38 which amplifies the voltage drop across current sensing resistor 40. The output of amplifier 38 controls transistor 42, which in turn regulates the voltage at junction 34, i.e. the gate voltage of power MOSFET 24.

The emitter voltage of transistor 42 is controlled by differential amplifier 44, whose input, as long as FET 45 is off, is the voltage drop through diode 46. Diode 46 is always conducting because, at all times, either transistor 20 or transistor 22 is on. The voltage drop across diode 46 and the gain of amplifier 44 are so chosen that junction 48 is maintained at about 0.8 V while FET 45 is off. The gain of amplifier 38 and the resistance of current sensing resistor 40 and voltage divider resistors 47, 49, 51, 53 are so adjusted that the gate voltage is about 1.4 V when the charging current of bulk capacitor 27 is about 0.7 A. Because the transistor 42 is operating in its linear mode at that point, a feedback occurs which keeps the charging current level.

When the bulk capacitor 27 has reached 90% of the peak input voltage (i.e. about half its full boost operating voltage), the power MOSFET 24 must be turned fully on in preparation for the boost operation. This is done by causing the logic control 11 to issue a chip enable signal CHIPEN 14 (time B in FIG. 3) which turns on FET 45. When FET 45 is on, it sinks 500 mA of additional current from the inverting input 52 of amplifier 44. This causes the output of amplifier 44 to rise to about 6V, causing transistor 42 to turn off and apply the full voltage of the floating 12 V supply to the gate of power MOSFET 24.

The bulk capacitor 27 now continues to charge and eventually reaches a voltage minimally sufficient for normal operation of the module 10 (time C in FIG. 3). This starts a timer (not shown) in the control logic which, after a 1.5 second delay, drives /SLEN high and enables the output (time D in FIG. 3) as represented by switch 130 in FIG. 1. By this time, the bulk capacitor 27 has reached full operational output voltage, and the circuit operation is stable.

If an overcurrent occurs through power MOSFET 24 (about 3.3 A in the circuit of FIG. 1), the output of amplifier 38 becomes high enough to turn transistor 42 back on, thereby turning power MOSFET 24 into a constant-current device at the current level set by the output of amplifier 44 according to the formula:

$$I_{LIMIT} \approx \frac{V_{48} + V_{BE42}}{G_{38} \times R_{40}}$$

for the circuit of FIG. 1, where $V_{48}$ is the output voltage of amplifier 48. $V_{BE42}$ is the base-emitter voltage of transistor 42, $G_{38}$ is the gain of amplifier 38, and $R_{40}$ is the resistance of current sensing resistor 40.

The CHIPEN signal, when it goes high at time B in FIG. 3 to enable the chip 10, also locks FET 18 off by grounding its gate through transistor 16. This prevents /SLEN from turning FET 18 on when it goes high at time D in FIG. 3, as long as the chip 10 stays enabled.

In addition to the current sensing input from resistor 40, the feedback circuit 36 also has a voltage sensing input from voltage divider junction 54 through zener diode 56. If the input voltage $V_{in}$ rises sufficiently to exceed the zener voltage of diode 56, the additional voltage at the non-inverting input 58 of amplifier 38 reduces the current through the power MOSFET 24 to prevent operation of the power MOSFET 24 outside its safe operating area (SOA). This is useful when $V_{in}$ is at its peak value at high line, or when a short circuit occurs in the output.

If the output is shorted during boost operation (time E in FIG. 3), the output voltage $V_{out}$ will drop very fast. As $V_{out}$ drops, the current through power MOSFET 24 will be limited to 3.3 A by the inventive circuit. As $V_{out}$ drops below the peak value of $V_{in}$, the control logic 11 detects that condition and drives CHIPEN low. This causes FET 45 to go off, and the power MOSFET 24 goes back to the 0.7 A constant current mode. With /SLEN high at this time, FET 18 goes on after a few milliseconds delay (due to the action of capacitor 28), thereby shutting down the power MOSFET 24. This two-step shutdown of power MOSFET 24 is necessary to prevent the inductively driven voltage $V_{in}$ from rising to a very high value which could exceed the breakdown voltage of the power MOSFET 24.

If the output is already shorted before /SLEN goes low, the circuit will go into the 0.7 A bulk capacitor charging mode when /SLEN goes low (time F in FIG. 3), but $V_{out}$ will not rise and CHIPEN will stay low. If that condition persists for 400 milliseconds, the control logic 11 drives /SLEN high again (time G in FIG. 3) to shut the module 110 down.

FIG. 4 illustrates the action of the circuit of FIG. 1 in the event of an input power glitch or interruption. The presence of input power ($V_{in}$ is denoted in the control logic 11 by an input-ready signal INRDY which is high as long as a rectified AC voltage is present at the output of rectifier 112.

At time H in FIG. 4, a short power glitch occurs. INRDY goes low, and $V_{out}$ begins to drop as bulk capacitor 27 discharges. However, before $V_{out}$ drops below 90% of the peak input voltage, power is restored at time I, INRDY goes high again, $V_{out}$ goes back to normal, and since CHIPEN has not gone low, the PFC module output remains enabled.

At time J in FIG. 4, a longer input power interruption occurs and INRDY goes low. Again, $V_{out}$ drops, but this time it drops below 90% of peak input voltage, and CHIPEN goes low. As in the case of a short circuit as discussed above, this results in an immediate disabling of the PFC module output, and a two-step shutdown of the power MOSFET bias. When power is now restored, INRDY goes high (time L), and the combination of INRDY and ENABLE MODULE 112, while the output is disabled, drives /SLEN low. The circuit then restarts itself in the same way as described above in connection with FIG. 2.

What is claimed is:

1. A power factor correction circuit for AC-to-DC power converters, comprising:

a source of rectified AC power;

a boost converter connected to said source, said boost converter including:
   an inductor, diode, and first capacitor connected in series across said source;
   a switch connected in parallel with said diode and said first capacitor, said switch being arranged to open and close at a frequency substantially higher than the frequency of said AC power;
   a transistor, a current sensing resistor, and a second capacitor connected in series with each other and in parallel with said first capacitor; and
   an output connected across said second capacitor, whereby said transistor controls the current flow to said second capacitor and said output;

a gate driver connected to said transistor and said current sensing resistor for controlling the base bias of said transistor; and a control logic connected to said source, said output and said gate driver for controlling said gate driver in response to the voltages of said source and said output;

said control logic and gate driver being arranged to bias said transistor into a low-current mode when said output voltage is less than a predetermined function of said source voltage, and into a high-current mode when said output voltage is more than said function.

2. The circuit of claim 1, in which said gate driver controls the current through said transistor by feedback from said current sensing resistor in said low-current mode, and by limiting the base bias in the high-current mode so that the current through said transistor does not exceed a predetermined value as sensed by said current sensing resistor.

3. The circuit of claim 1, in which said transistor is a power MOSFET, said second capacitor is a bulk capacitor, the current in said low-current mode is substantially 0.7 A, and the current in said high-current mode is substantially 3.3 A.

4. The circuit of claim 1, in which said control logic is arranged to generate a surge limit enable signal in response to an external module enabling signal, and a chip enable signal in response to said output voltage exceeding a predetermined percentage of the peak value of said source voltage, said gate driver being arranged to bias said transistor into said high-current mode in response to said chip enable signal being active, and into said low-current mode when said chip enable signal is inactive but said surge limit enable signal is active.

5. The circuit of claim 4, in which said control logic is further arranged to generate an output enable signal for allowing a load to be connected to said output in response to said output voltage reaching a predetermined operating level.

6. The circuit of claim 5, in which the activation of said output enable signal is delayed a predetermined time after said output voltage reaches said predetermined operating level.

7. The circuit of claim 5, in which the activation of said output enable signal causes said surge limit enable signal to become inactive.

8. The circuit of claim 4, in which said gate driver, upon said chip enable signal going inactive while said surge limit enable signal is also inactive, biases said transistor into said low-current mode for a few milliseconds before shutting it off.

9. The circuit of claim 4, in which said surge limit enable signal is made inactive if said chip enable signal does not become active within a predetermined interval after said surge limit enable signal becomes active.

* * * * *